US007307129B2

(12) United States Patent
Lee et al.

(10) Patent No.: US 7,307,129 B2

(45) Date of Patent: Dec. 11, 2007

(54) METHOD FOR PREPARING LATEX CONTAINING PIGMENT COPOLYMERIZED WITH A CRYSTALLINE POLYMER

(75) Inventors: Jun-young Lee, Seoul (KR); Sang-woo Kim, Seoul (KR); Kyung-yol Yon, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 337 days.

(21) Appl. No.: 11/037,068

(22) Filed: Jan. 19, 2005

(65) Prior Publication Data

US 2005/0203245 A1 Sep. 15, 2005

(30) Foreign Application Priority Data

Jan. 20, 2004 (KR) ..................... 10-2004-0004418

(51) Int. Cl.
*C08F 2/22* (2006.01)

(52) U.S. Cl. .................... 526/88; 526/309; 526/348.2; 526/348.3

(58) Field of Classification Search .................. 526/88, 526/309, 348.2, 348.3
See application file for complete search history.

(56) References Cited

U.S. PATENT DOCUMENTS 5,298,355 A 3/1994 Tyagi et al.
5,413,890 A 5/1995 Mori et al.
5,863,696 A 1/1999 Koyama et al.
5,955,233 A 9/1999 Urashima et al.
6,120,967 A 9/2000 Hopper et al.
6,395,442 B1 5/2002 Hayashi et al.

FOREIGN PATENT DOCUMENTS

| | | |
|---|---|---|
| JP | 61-120161 | 6/1986 |
| JP | 07-181726 | 7/1995 |
| JP | 2001-042568 | 2/2001 |
| JP | 2001042568 A * | 2/2001 |

* cited by examiner

*Primary Examiner*—Kelechi C. Egwim
(74) *Attorney, Agent, or Firm*—Staas & Halsey LLP

(57) ABSTRACT

A method of preparing a latex that includes pigments copolymerized with a crystalline polymer includes: dispersing a pigment and a dispersing agent in water having an ultra-high purity to obtain a pigment dispersion; dissolving a crystalline monomer in a basic monomer mixture to obtain an organic phase; dissolving while heating the dispersing agent in water having an ultra-high purity, and then mixing the solution with the pigment dispersion to obtain an aqueous phase; mixing and agitating the organic phase and the aqueous phase to obtain a homogenized solution; agitating and heating the homogenized solution; adding a polymerization initiator to the homogenized solution to be reacted; and cooling the reaction solution to room temperature.

18 Claims, 4 Drawing Sheets

METHOD FOR PREPARING LATEX CONTAINING PIGMENT COPOLYMERIZED WITH A CRYSTALLINE POLYMER

CROSS-REFERENCE TO RELATED APPLICATIONS

This application claims the priority of Korean Patent Application No. 2004-4418, filed on Jan. 20, 2004, in the Korean Intellectual Property Office, the disclosure of which is incorporated herein in its entirety by reference.

BACKGROUND OF THE INVENTION

1. Field of the Invention

The present invention relates to a method for preparing a latex containing pigments copolymerized with a crystalline polymer, and more particularly, a method for preparing a latex containing pigments copolymerized with a crystalline polymer by which a latex containing pigments copolymerized with a crystalline polymer is prepared in one process without requiring a separate aggregation process, and a low fusing temperature is implemented by substituting a crystalline polymer material having a low melting point of the prepared latex for a mold release agent.

2. Description of the Related Art

A conventional toner used in an electrophotographic imaging apparatus comprises a resin, a pigment, a charge control agent and a mold release agent. Of these components, the resin constitutes about 90% by weight of the total weights of a toner, and plays a role in attaching a toner particle to paper, and the like. A pigment embodies a color, and a charge control agent controls the charges of a toner to assist a toner particle in forming an image efficiently. Finally, a mold release agent enhances the release between a roller and a toner on fusing a toner to prevent an offset and or paper jam.

Such a toner particle may be largely categorized into a pulverized toner prepared by a pulverizing method and a polymerized toner prepared by polymerization. The former is a classical method, and a coloring agent, a charge control agent (CCA) and a mold release agent are melted and dispersed uniformly in a binder resin to obtain a mixture. The mixture is pulverized to a size of a few μm to several tens of μm by a mechanical method, such as an airflow type or a mechanical pulverizer, and the resulting product is classified by size, and then to impart mobility, charge stability, cleanability, and the like, an external additive is added and applied uniformly on a surface.

However, the method of preparing a toner by a pulverizing method has the following disadvantages:

i) the size of the prepared toner particle is difficult to control, ii) toner particles are very coarse and irregular, and thus, contacting faces between the toner particles becomes larger, thus decreasing mobility, since the shape of the pulverized toner particles is uncontrolled, iii) the yield is low since size distribution of toner particles is very large, and thus, only toner particles within a specific size range are selected and used, iv) it is difficult to impart and control electrical properties of the surfaces, due to irregularity of the surfaces, v) a transferring property and developing property are degraded since the weight distribution of each particle is high, and vi) a dispersion between a binder resin and an internal additive is difficult.

Alternatively, the method of preparing a toner by polymerization is a superior method over the pulverizing method. The toners prepared by this method are classified into a suspension-polymerized toner, an emulsion-polymerized toner, and the like. For the emulsion-polymerized toner, which has a particle size of 5 to 15 μm, which is a general size of toner particles, is prepared by preparing an emulsion comprising a resin having a particle size less than 1 μm, a pigment, a mold release agent, and the like, and then adding an aggregating agent thereto to aggregate the emulsion. As described above, a mold release agent is a component of toner particles essential in preventing an offset or paper jam.

Referring to FIG. 1 and FIG. 2, a method of preparing an emulsion-polymerized toner is schematically shown, according to U.S. Pat. Nos. 6,120,967 and 5,863,696.

In FIG. 1, the method includes the operations of preparing an emulsion of mold release agent comprising a polyethylene mold release agent, an anionic dispersing agent, water, and emulsifying the mold release agent using a homogenizer (102); preparing a latex by combining a monomer (styrene plus butyl acrylate plus acrylic acid), an anionic surfactant and a polymerization initiator and polymerizing at 70° C. (104); mixing a pigment and emulsion of the mold release agent and the latex (106); adding an aggregating agent (polyammonium chloride) and aggregating for 30 minutes at 48° C. (108); and melting the aggregated particles by allowing to stand for an hour at 90° C. (110).

In FIG. 2, the method includes the operations of dispersing a pigment by combining the pigment, a dispersing agent (sodium dodecyl sulfate), and distilled water and dispersing for one hour using an ultrasonic homogenizer (202); mixing the pigment dispersion and a monomer by combining the monomer (styrene, butyl acrylate, and methacrylic acid), the pigment dispersion and a dispersing agent (204); polymerizing by agitating for 7 hours at a speed of 500 rpm and 70° C. (206); and filtering and drying (208).

U.S. Pat. No. 6,120,967 recites that an emulsion of a mold release agent is separately prepared, the emulsion is mixed with a latex and a pigment, and an aggregating agent such as a polyammonium chloride is added to a mixture, thus binding together a pigment, emulsion particles of a mold release agent and a latex.

Alternatively, U.S. Pat. No. 5,863,696 describes a process in which a pigment dispersion is first prepared, mixed with a monomer, and then polymerization is performed, thus binding a pigment and a latex without an aggregating agent. However, even in this case, if one is to include a mold release agent, a procedure of aggregating a mold release agent by an aggregating agent by using a separate emulsion of a mold release agent is required.

However, in conventional techniques, when a latex, a pigment and an emulsion of a mold release agent are bound together by use of an aggregating agent, binding even between the same types of particles as well as between different types of particles occurs, and the amounts of a pigment and a wax are difficult to control. Even when a mold release agent is included by using a separate emulsion of a mold release agent, the selection of a dispersing agent that may influence the physical properties of a toner is limited, and preparation of particles less than 1 μm in diameter is difficult.

Furthermore, in conventional techniques, when using a commercial emulsion, the free selection of a mold release agent and an emulsifying agent is limited. Even when using an emulsion of a mold release agent prepared directly, a temperature that is higher than a melting point of a mold release agent and a high speed dispersing apparatus are required, and thus the preparation is difficult, since a conventional mold release agent in a solid state should be dispersed in water in particles less than 1 μm in diameter.

SUMMARY OF THE INVENTION

The present invention provides a method for preparing a latex containing pigments copolymerized with a crystalline polymer by which a latex containing pigments copolymerized with a crystalline polymer can be prepared in one process without requiring a separate aggregation process, and a low fusing temperature can be provided by substituting a crystalline polymer material having a low melting point of the prepared latex for a mold release agent.

According to an aspect of the present invention, a method is utilized to prepare a latex containing pigments copolymerized with a crystalline polymer, the method comprising: dispersing a pigment and a dispersing agent in water having an ultra-high purity to obtain a pigment dispersion; dissolving a crystalline monomer in a basic monomer mixture to obtain an organic phase; dissolving while heating the dispersing agent in water having an ultra-high purity, and then mixing the solution with the pigment dispersion to obtain an aqueous phase; mixing and agitating the organic phase and the aqueous phase to obtain a homogenized solution; agitating and heating the homogenized solution; adding a polymerization initiator to the homogenized solution to be reacted; and cooling the reaction solution to room temperature.

A method of preparing a latex according to an embodiment of the present invention may provide a latex that includes pigments copolymerized with a crystalline polymer in one process without requiring a separate aggregation process, facilitate control of the amounts and aggregation of each component in a latex, and provide a latex having a narrow particle size distribution. Further, a low fusing temperature may be provided by substituting a crystalline polymer material having a low melting point of the prepared latex as a mold release agent, and a melting point of a crystalline polymer may be controlled by readily controlling the type, the amount and a polymerization degree of a crystalline polymer.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
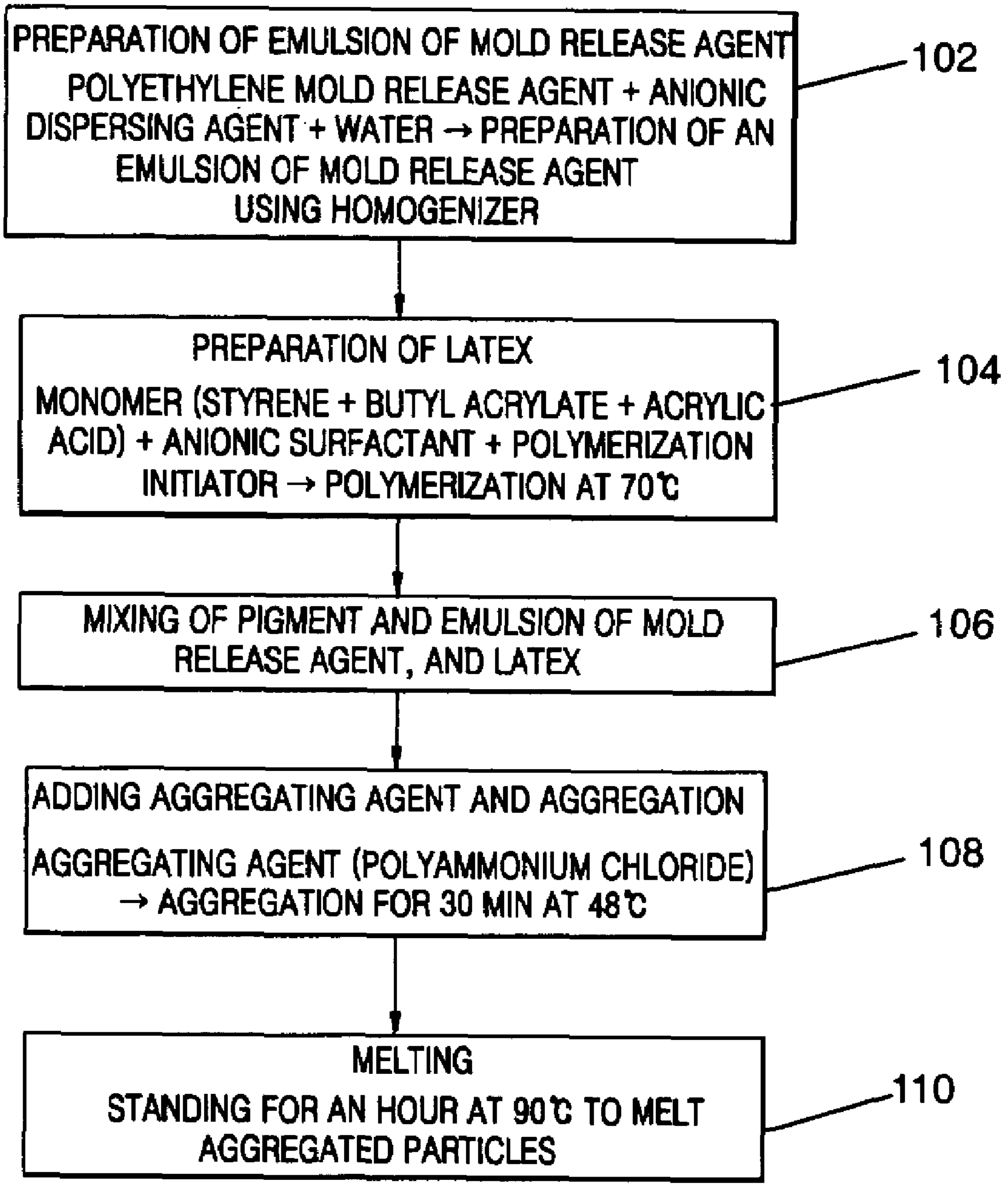
FIG. 1 is a schematic process flow chart of the preparation of a latex comprising a mold release agent, according to a conventional technique.
Figure 2:
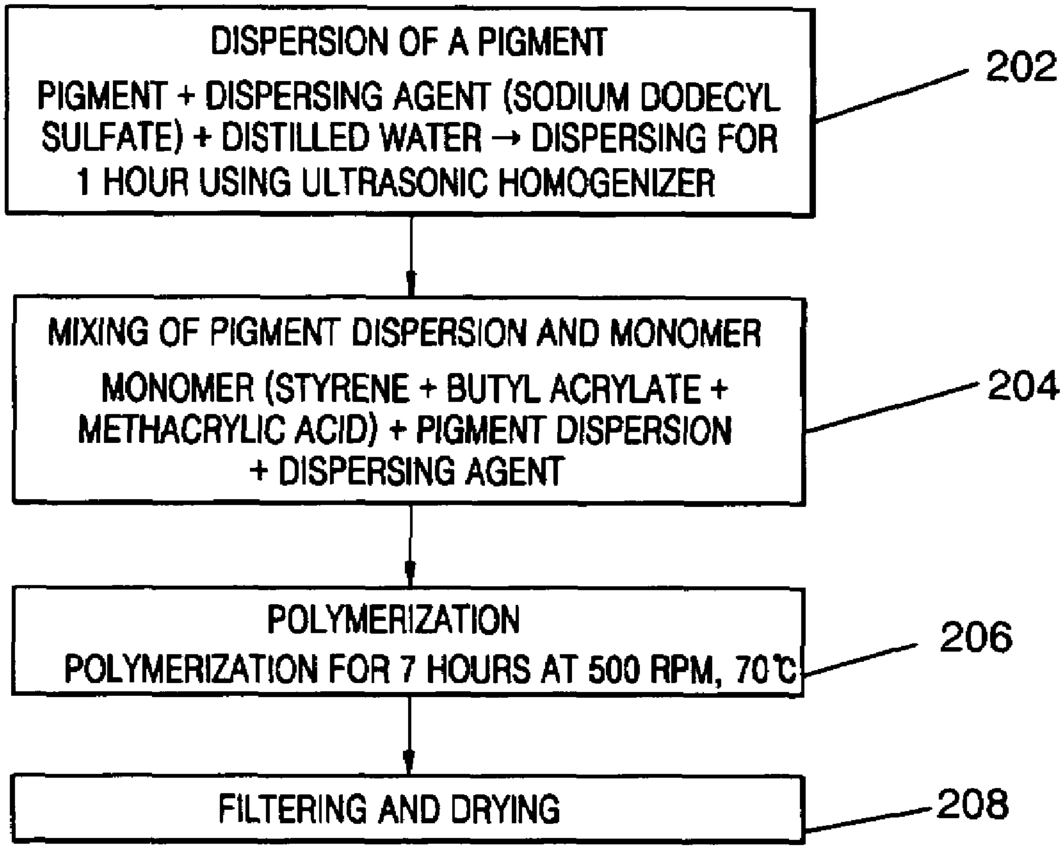
FIG. 2 is a schematic process flow chart of the preparation of a latex comprising a mold release agent, according to another conventional technique.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 3:
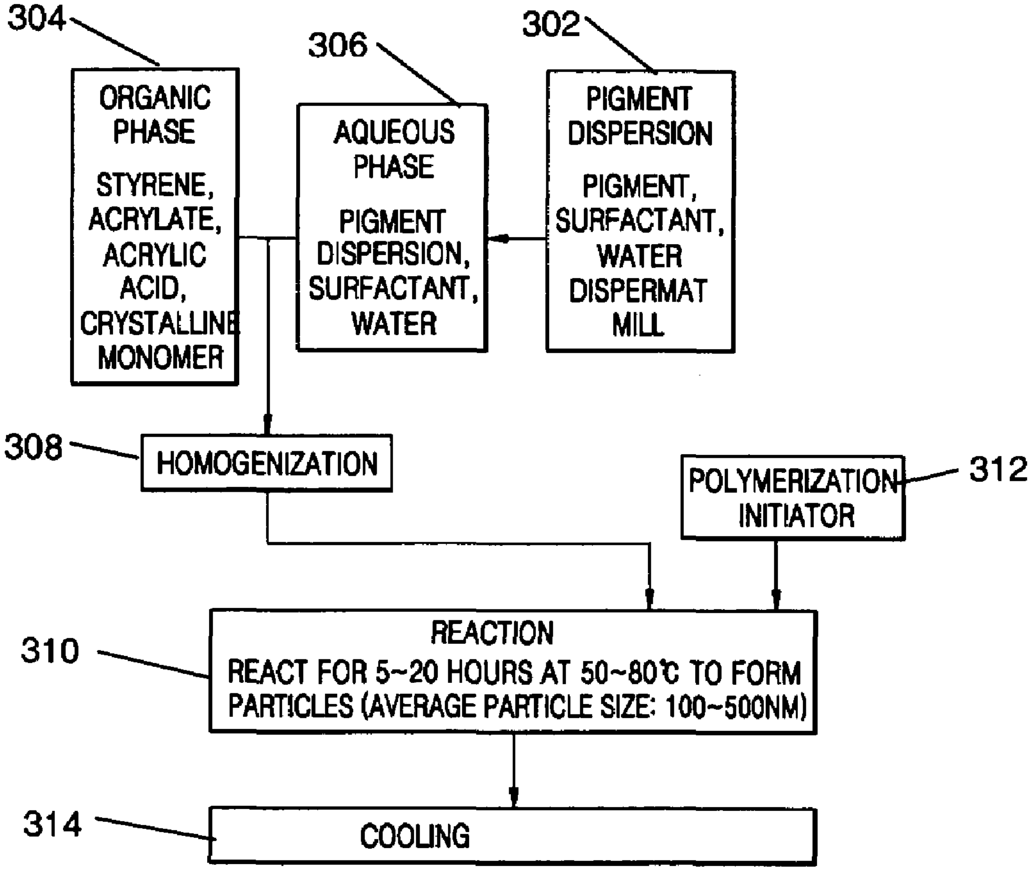
FIG. 3 is a schematic process flow chart of the preparation of a latex that includes pigments copolymerized with a crystalline polymer, according to an embodiment of the present invention.

As illustrated by the operations set forth in FIG. 3, a method of preparing a latex according to an embodiment of the present invention comprises, generally: preparation of a pigment dispersion (302); preparation of an organic phase (304); preparation of an aqueous phase (306); preparation of a homogenized solution by mixing and agitating the organic phase and the aqueous phase (308); agitating and heating the homogenized solution (310); polymerization of the homogenized solution (312); and cooling to room temperature (314), as described more fullybelow.

A dispersing agent used in preparation of a pigment dispersion may be, but is not limited to, an anionic surfactant selected from the group consisting of a carboxylate, an ester sulfate and a sulfonate; or a non-ionic surfactant selected from the group consisting of a polyoxyethylene alkylether, a polyoxyethylene alkylphenylether, a polyoxyethylene fatty acid ester, a sorbitan fatty acid ester, a polyoxysorbitan fatty acid ester, a polyoxyethylene alkylamine and an oxyethyleneoxypropylene block copolymer.

A pigment used in the preparation of the pigment dispersion may be a pigment known to those skilled in the art. To prepare a black and white toner, carbon black or aniline black may be used. To prepare a color toner, carbon black may be used as a black color of a pigment, and yellow, magenta and cyan pigments may be also be included.

The yellow pigment may be a condensed nitrogen compound, an isoindolinone compound, an anthraquine compound, an azo metal complex or an allyl imide compound. Specifically, C.I. PIGMENT YELLOW 12, 13, 14, 17, 62, 74, 83, 93, 94, 95, 109, 110, 111, 128, 129, 147 or 168, or the like, may be used.

The magenta pigment may be a condensed nitrogen compound, an anthraquine compound, a quinacridone compound, a naphthol compound, a benzoimidazole compound, a thioindigo compound or a perylene compound. Specifically, C.I. PIGMENT RED 2, 3, 5, 6, 7, 23, 48:2, 48:3, 48:4, 57:1, 81:1, 144, 146, 166, 169, 177, 184, 185, 202, 206, 220, 221 or 254, or the like, may be used.

The cyan pigment may be a copper phthalocyanine and its derivatives, or an anthraquine compound. Specifically, C.I. PIGMENT BLUE 1, 7, 15, 15:1, 15:2, 15:3, 15:4, 60, 62 or 66, or the like, may be used.

Such pigments may be used alone or in a mixture of at least two types of pigments, and may be selected by consideration of color, saturation, brightness, weatherability, dispersity in toners, or the like.

The pigment dispersion in operation i) may be prepared by agitating with a glass bead at an agitation speed of 2,000 to 10,000 rpm for 1 to 5 hours using a milling equipment, such as a DISPEMAT dispersing apparatus.

The basic monomer mixture used in the preparation of an organic phase may be a mixture of an aromatic-based vinyl monomer selected from the group consisting of a styrene, an o-methyl styrene, an m-methyl styrene, a p-methyl styrene, a p-methoxy styrene, a p-phenyl styrene, a p-chloro styrene, a p-ethyl styrene, a p-n-butyl styrene, a p-tert-butyl styrene, a p-n-hexyl styrene, a p-n-octyl styrene, a p-n-nonyl styrene, a p-n-decyl styrene, a p-n-dodecyl styrene, a 2,4-dimethyl styrene, a 3,4-dichloro styrene and their derivatives; a (meth)acrylic acid ester-based monomer selected from the group consisting of an acrylic acid methyl, an acrylic acid ethyl, an acrylic acid butyl, an acrylic acid-2-ethyl hexyl, an acrylic acid cyclohexyl, an acrylic acid phenyl, a methacrylic acid methyl, a methacrylic acid ethyl, a methacrylic acid butyl, a methacrylic acid hexyl, a methacrylic acid-2-ethyl hexyl, β-hydroxy acrylic acid ethyl, γ-amino acrylic acid propyl, a methacrylic acid stearyl, a methacrylic acid dimethyl amino ethyl, a methacrylic acid diethyl amino ethyl and their derivatives; a vinyl ester-based monomer selected from the group consisting of an acetic acid vinyl, a propionic acid vinyl, a benzoic acid vinyl and their derivatives; a vinyl ether-based monomer selected from the group consisting of a vinyl methyl ether, a vinyl ethyl ether, a vinyl isobutyl ether, a vinyl phenyl ether and their derivatives; a mondolefine-based monomer selected from the group consisting of an ethylene, a propylene, an isobutylene, a 1-butene, a 1-pentene, a 4-methyl-1-pentene and their derivatives; a diolefine-based monomer selected from the group consisting of a butadiene, an isoprene, a chloroprene and their derivatives; and a halogenated olefine-based monomer selected from the group consisting of a vinyl chloride, a vinylidene chloride, a vinyl fluoride and their derivatives.

Also, the crystalline monomer used in the preparation of an organic phase may have 18 to 32 carbon atoms, and a melting point of 30 to 70° C. The crystalline monomer may be, but is not limited to, a stearyl acrylate, a stearyl methacrylate, a hexadecyl acrylate, a heptadecyl acrylate, a nonadecyl acrylate, a nonadecyl methacrylate, an aralkyl acrylate, an aralkyl methacrylate, a behenyl acrylate, a behenyl methacrylate, a pentacosyl acrylate, a pentacosyl methacrylate, a heptacosyl acrylate, a heptacosyl methacrylate, an octadecyl acrylate, an octadecyl methacrylate, or the like.

The crystalline monomer forms a crystalline polymer by copolymerization with the basic monomer. The crystalline polymer, when the pigment-containing latex is used as a toner for printer imaging, functions as a mold release agent that plays a role in preventing an offset or paper jam on fusing a toner. Thus, by the method of preparing a latex according to an embodiment of the present invention, a low fusing temperature may be provided by substituting a crystalline polymer material having a low melting point for a mold release agent, and the melting point of the crystalline polymer may be controlled by controlling a type readily, an amount, a polymerization degree, or the like, of a crystalline monomer.

The amount of the crystalline polymer in latex may be 1 to 50 parts by weight based on 100 parts by weight of the latex. When the amount of the crystalline polymer is less than 1 part by weight, a mold releasing effect by the crystalline polymer cannot be obtained. When the amount exceeds 50 parts by weight, a problem in fusing a toner and imaging may arise.

The basic monomer in the organic phase prepared as above then forms a polymer material having a glass transition temperature of 40 to 100° C. by polymerization, and the crystalline monomer forms a crystalline polymer material having a melting point of 30 to 80° C. by copolymerization with the basic monomer.

An aqueous phase is prepared for mixing with an organic phase that is prepared as described above to obtain a homogenized solution, and the aqueous phase is prepared by heat-dissolving a dispersing agent in water having an ultra-high purity, and then mixing with a pigment dispersion prepared in the operation (302).

A dispersing agent used in preparing an aqueous phase may be, but is not limited to, a non-ionic surfactant selected from the group consisting of a polyoxyethylene alkyl ether, a polyoxyethylene alkyl phenyl ether, a polyoxyethylene fatty acid ester, a sorbitan fatty acid ester, a polyoxy sorbitan fatty acid ester, a polyoxyethylene alkyl amine and an oxyethyleneoxypropylene block copolymer. Herein, water having an ultra-high purity may be obtained by foaming with a nitrogen gas to remove any oxygen.

After preparing the organic phase and the aqueous phase, the organic phase and the aqueous phase are mixed in a reactor, and homogenized by using a homogenizer such as IKA ULTRA TURREX. For example, homogenization may be carried out at an agitation speed of 1,000 to 7,000 rpm for 1 to 60 min.

Then, the solution homogenized by the homogenization process may be heated to 50 to 80° C. at an agitation speed of 100 to 800 rpm to carry out polymerization.

After agitating and heating the homogenized solution, the polymerization reaction is carried out by adding a polymerization initiator to the homogenized solution, and the inside of the reactor is purged with nitrogen gas. A polymerization initiator may be, but is not limited to, a water-soluble polymerization initiator selected from a group consisting of a persulfate, an azo-based compound and a peroxide compound. A persulfate polymerization initiator may be a potassium persulfate, an ammonium persulfate, or the like, and an azo based compound polymerization initiator may be a 4,4'-azobis-4-cyano valeric acid and its salt, and a 2,2'-azobis(2-amidino propane) salt, or the like. The amount of the polymerization initiator may be 1 to 5 parts by weight based on 100 parts by weight of the homogenized solution. When the amount of the polymerization initiator is less than 1 part by weight of the homogenized solution, a sufficient polymerization initiating effect cannot be obtained. When the amount of the polymerization initiator exceeds 5 parts by weight of the homogenized solution, problems of a runaway reaction and generation of a low molecular weight body may arise.

A polymerization time may be 5 to 24 hours. When the polymerization time is less than 5 hours, a sufficient polymerization cannot be performed.

After performing polymerization as described above, a latex containing pigments copolymerized with a crystalline polymer may be prepared a final operation of cooling the reaction solution to room temperature.

The present invention will now be described in greater detail with reference to the following examples. The following examples are for illustrative purposes only, and are not intended to limit the scope of the invention.

EXAMPLE 1

1) Preparation of a Pigment Dispersion

A cyan pigment dispersion was prepared by agitating 30 g of PB15:3, a cyan pigment, 100 g of water having an ultra-high purity and 3 g of DOWFAX, an anionic surfactant with 200 g of a glass bead in a DISPERMAT dispersing apparatus at an agitation speed of 3,000 rpm for 3 hours. The volume average particle size of the pigment dispersion was 110 nm.

2) Preparation of an Organic Phase

An organic phase was prepared by adding 10 g of an octadecyl acrylate as a crystalline monomer to 100 g of a basic monomer mixture comprising a styrene, a butyl acrylate and an acrylic acid (mixed weight ratio of 7:2:1 to 7.5:1:0.5) to be dissolved.

3) Preparation of an Aqueous Phase

An aqueous phase was prepared by dissolving 5 g of the pigment dispersion prepared in above 1), 3 g of DOWFAX, an anionic surfactant, and 3 g of TRITON, a non-ionic surfactant, in 200 g of water having an ultra-high purity.

4) Preparation of a Homogenized Solution

The organic phase prepared in operation 2) above and the aqueous phase prepared in operation 3) above were mixed in 1 l reactor, and then homogenized using an IKA ULTRA TURREX at 7,000 rpm for 30 min. Then, the homogenized solution was poured into a reaction bath, and heated to 75° C. while agitating at 100 rpm.

5) Polymerization Reaction and Cooling

When the temperature within the reaction bath reached 75° C., 1 g of potassium persulfate was introduced as a polymerization initiator, and the inside of the reactor was purged with nitrogen gas. The polymerization reaction time was 24 hours, and after completion of the reaction, the reaction solution was cooled to room temperature.

On analyzing the latex particle prepared according to Example 1 by using a differential scanning calorimeter (DSC), the glass transition temperature and the melting point were, respectively, 69° C. and 42° C. The volume average size and the number average size of the latex particle prepared were, respectively, 170 nm and 130 nm.

EXAMPLE 2

A latex particle was prepared in the same manner as described in Example 1, except that a 10:1 mixture of a styrene and an octadecyl acrylate was used as an organic phase. The glass transition temperature and the melting point of the prepared latex particle were, respectively, 96° C. and 40° C. The volume average size and the number average size of the latex particle were, respectively, 162 nm and 122 nm.

EXAMPLE 3

A latex particle was prepared in the same manner as described in Example 1, except that the amount of the octadecyl acrylate was 40 g. The glass transition temperature and the melting point of the prepared latex particle were, respectively, 69° C. and 42° C. The volume average size and the number average size of the latex particle were, respectively, 200 nm and 140 nm.

EXAMPLE 4

A latex particle was prepared in the same manner as described in Example 1, except that a behenyl acrylate was used instead of the octadecyl acrylate. The glass transition temperature and the melting point of the prepared latex particle were, respectively, 96° C. and 57° C. The volume average size and the number average size of the latex particle were, respectively, 190 nm and 144 nm.

EXAMPLE 5

A latex particle was prepared in the same manner as described in Example 1, except that a PY180 was used as a pigment instead of PB15:3. The particle size of the pigment dispersion was 220 nm. The volume average size and the number average size of the prepared latex particle were, respectively, 370 nm and 230 nm.

EXAMPLE 6

A latex particle was prepared in the same manner as described in Example 1, except that a PR122 was used as a pigment instead of PB15:3. The particle size of the pigment dispersion was 380 nm. The volume average size and the number average size of the prepared latex particle were, respectively, 491 nm and 310 nm.

EXAMPLE 7

A latex particle was prepared in the same manner as described in Example 1, except that carbon black (NIPEX 70, manufactured by DEGUSSA) was used as a pigment instead of PB15:3. The particle size of the pigment dispersion was 164 nm. The volume average size and the number average size of the prepared latex particle were, respectively, 250 nm and 201 nm.

A method of preparing a latex according to an embodiment of the present invention may provide a latex that includes pigments copolymerized with a crystalline polymer in one process without requiring a separate aggregation process, facilitate control of the amounts and aggregation of each component in a latex, and provide a latex having a narrow particle size distribution. Further, by the method of preparing a latex according to an embodiment of the present invention, a low fusing temperature may be provided by substituting a crystalline polymer material having a low melting point for a mold release agent, and the melting point of the crystalline polymer may be controlled by controlling readily a type, an amount, a polymerization degree, or the like, of a crystalline monomer.

Figure 4:
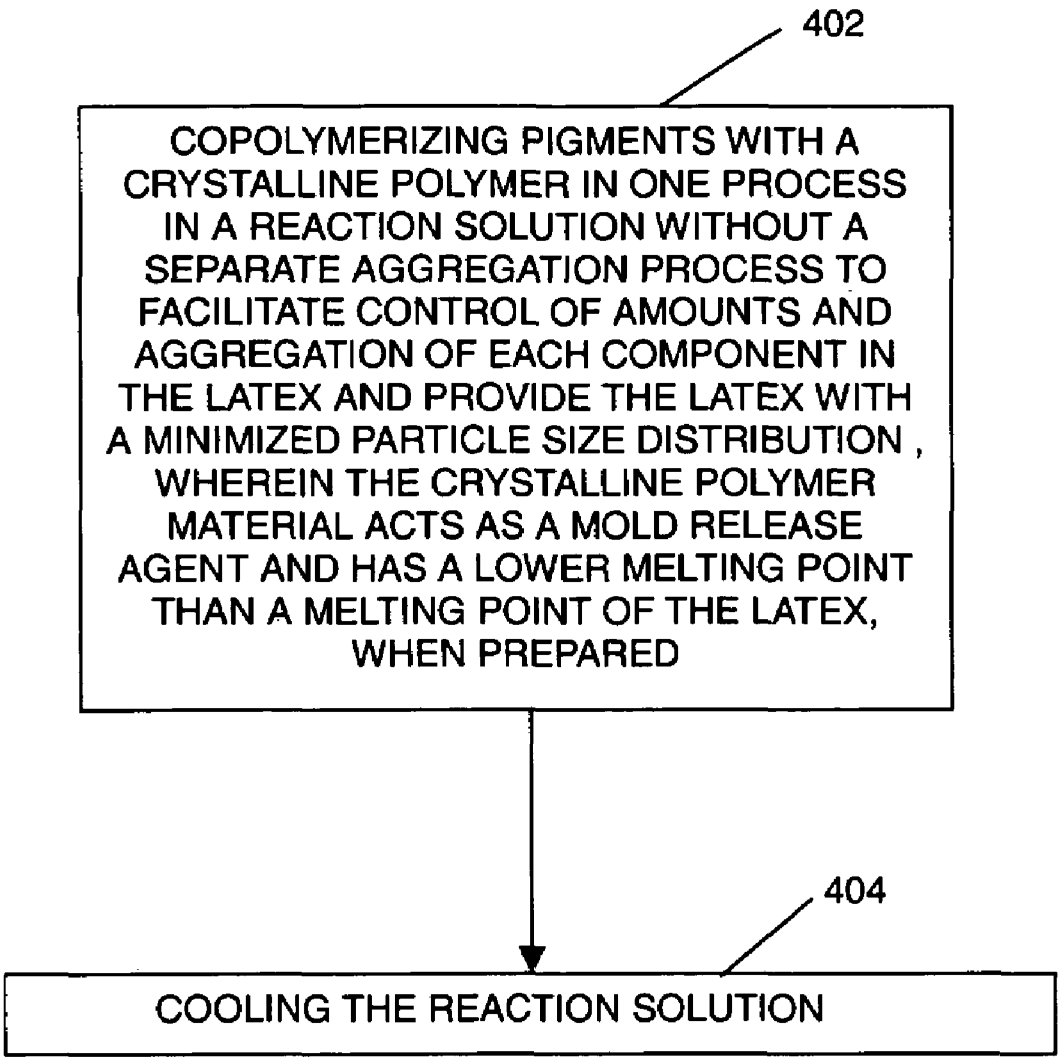
FIG. 4 is a schematic process flow chart of the preparation of a latex that includes pigments copolymerized with a crystalline polymer, according to another embodiment of the present invention.

As set forth in the operations illustrated in FIG. 4, a method of preparing a latex in accordance with another embodiment of the present invention comprises: copolymerizing pigments with a crystalline polymer in one process in a reaction solution without a separate aggregation process to facilitate control of amounts and aggregation of each component in the latex and provide the latex with a minimized particle size distribution, wherein the crystalline polymer material acts as a mold release agent and has a lower melting point than a melting point of the latex, when prepared (402); and cooling the reaction solution (404). Operation (402) may include any of the following further sub-operations.

In the method illustrated in FIG. 4, a pigment and a dispersing agent may be dispersed in water having an ultra-high purity to obtain a pigment dispersion and the dispersing agent used in the dispersing the pigment and the dispersing agent in water may be an anionic surfactant selected from the group consisting of a carboxylate, an ester sulfate and a sulfonate; or a non-ionic surfactant selected from the group consisting of a polyoxyethylene alkylether, a polyoxyethylene alkylphenylether, a polyoxyethylene fatty acid ester, a sorbitan fatty acid ester, a polyoxysorbitan fatty acid ester, a polyoxyethylene alkylamine and an oxyethyleneoxypropylene block copolymer.

Further, in the operations illustrated in FIG. 4, the pigment dispersion in the dispersing the pigment and the dispersing agent in water may be prepared by agitating at a speed of 2,000 to 10,000 rpm for 1 to 5 hours.

Also, in the operations illustrated in FIG. 4, a crystalline monomer may be dissolved in a basic monomer mixture to obtain an organic phase and the basic monomer mixture may be a mixture of an aromatic-based vinyl monomer selected from the group consisting of a styrene, an o-methyl styrene, an m-methyl styrene, a p-methyl styrene, a p-methoxy styrene, a p-phenyl styrene, a p-chloro styrene, a p-ethyl styrene, a p-n-butyl styrene, a p-tert-butyl styrene, a p-n-hexyl styrene, a p-n-octyl styrene, a p-n-nonyl styrene, a p-n-decyl styrene, a p-n-dodecyl styrene, a 2,4-dimethyl styrene, a 3,4-dichloro styrene and their derivatives; a (meth)acrylic acid ester-based monomer selected from the group consisting of an acrylic acid methyl, an acrylic acid ethyl, an acrylic acid butyl, an acrylic acid-2-ethyl hexyl, an acrylic acid cyclohexyl, an acrylic acid phenyl, a methacrylic acid methyl, a methacrylic acid ethyl, a methacrylic acid butyl, a methacrylic acid hexyl, a methacrylic acid-2-ethyl hexyl, β-hydroxy acrylic acid ethyl, γ-amino acrylic acid propyl, a methacrylic acid stearyl, a methacrylic acid dimethyl amino ethyl, a methacrylic acid diethyl amino ethyl and their derivatives; a vinyl ester-based monomer selected from the group consisting of an acetic acid vinyl, a propionic acid vinyl, a benzoic acid vinyl and their derivatives; a vinyl ether-based monomer selected from the group consisting of a vinyl methyl ether, a vinyl ethyl ether, a vinyl isobutyl ether, a vinyl phenyl ether and their derivatives; a monoolefine-based monomer selected from the group consisting of an ethylene, a propylene, an isobutylene, a 1-butene, a 1-pentene, a 4-methyl-1-pentene and their derivatives; a diolefine-based monomer selected from the group consisting of a butadiene, an isoprene, a chloroprene and their derivatives; and a halogenated olefine-based monomer selected from the group consisting of a vinyl chloride, a vinylidene chloride, a vinyl fluoride and their derivatives.

Further, in the operations illustrated in FIG. 4, the crystalline monomer may have 18 to 32 carbon atoms, and a melting point of 30° C. to 70° C.

Also, in the operations illustrated in FIG. 4, the crystalline monomer may form a crystalline polymer by copolymerization with the basic monomer, and the amount of the crystalline polymer in the latex may be 1 to 50 parts by weight based on 100 parts by weight of the latex.

Further, in the operations illustrated in FIG. 4, the basic monomer may form a polymer material having a glass transition temperature of 40° C. to 100° C. by polymerization, and the crystalline monomer may form a crystalline polymer material having a melting point of 30° C. to 80° C. by copolymerization with the basic monomer.

Also, in the operations illustrated in FIG. 4, a dispersing agent may be dissolved, while heating, in water having an ultra-high purity to form a solution, and then the solution may be mixed with the pigment dispersion to form an aqueous phase, wherein the dispersing agent may be a non-ionic surfactant selected from the group consisting of a polyoxyethylene alkyl ether, a polyoxyethylene alkyl phenyl ether, a polyoxyethylene fatty acid ester, a sorbitan fatty acid ester, a polyoxy sorbitan fatty acid ester, a polyoxyethylene alkyl amine and an oxyethyleneoxypropylene block copolymer.

Further, in the operations illustrated in FIG. 4, the organic phase and the aqueous phase may be mixed and agitated to achieve homogenization, and the mixing and agitation may be carried out at an agitation speed of 1,000 to 7,000 rpm for 1 to 60 min.

Also, in the operations illustrated in FIG. 4, the agitation speed in the agitating and heating the homogenized solution may be 100 to 800 rpm, and the heating temperature may be 50° C. to 80° C.

Further, in the operations illustrated in FIG. 4, a polymerization initiator may be added to the homogenized solution and may be a water-soluble polymerization initiator selected from the group consisting of a persulfate, an azo based compound and a peroxide compound.

Also, in the operations illustrated in FIG. 4, the polymerization initiator may be used in 1 to 5 parts by weight based on 100 parts by weight of the homogenized solution.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of preparing a latex containing pigments copolymerized with a crystalline polymer comprising:
- dispersing a pigment and a dispersing agent in water having an ultra-high purity to obtain a pigment dispersion;
- dissolving a crystalline monomer in a basic monomer mixture to obtain an organic phase;
- dissolving, while heating, the dispersing agent in water having an ultra-high purity, and then mixing the solution with the pigment dispersion to obtain an aqueous phase;
- mixing and agitating the organic phase and the aqueous phase to obtain a homogenized solution;
- agitating and heating the homogenized solution;
- adding a polymerization initiator to the homogenized solution to be reacted; and
- cooling the reaction solution to room temperature.

2. The method of preparing a latex of claim 1, wherein a dispersing agent is an anionic surfactant selected from the group consisting of a carboxylate, an ester sulfate and a sulfonate; or a non-ionic surfactant selected from the group consisting of a polyoxyethylene alkylether, a polyoxyethylene alkylphenylether, a polyoxyethylene fatty acid ester, a sorbitan fatty acid ester, a polyoxysorbitan fatty acid ester, a polyoxyethylene alkylamine and an oxyethyleneoxypropylene block copolymer.

3. The method of preparing a latex of claim 1, wherein the pigment dispersion is prepared by agitating at a speed of 2,000 to 10,000 rpm for 1 to 5 hours.

4. The method of preparing a latex of claim 1, wherein the basic monomer mixture is a mixture of an aromatic-based vinyl monomer selected from the group consisting of a styrene, an o-methyl styrene, an m-methyl styrene, a p-methyl styrene, a p-methoxy styrene, a p-phenyl styrene, a p-chloro styrene, a p-ethyl styrene, a p-n-butyl styrene, a p-tert-butyl styrene, a p-n-hexyl styrene, a p-n-octyl styrene, a p-n-nonyl styrene, a p-n-decyl styrene, a p-n-dodecyl styrene, a 2,4-dimethyl styrene, a 3,4-dichloro styrene and their derivatives; a (meth)acrylic acid ester-based monomer selected from the group consisting of an acrylic acid methyl, an acrylic acid ethyl, an acrylic acid butyl, an acrylic acid-2-ethyl hexyl, an acrylic acid cyclohexyl, an acrylic acid phenyl, a methacrylic acid methyl, a methacrylic acid ethyl, a methacrylic acid butyl, a methacrylic acid hexyl, a methacrylic acid-2-ethyl hexyl, β-hydroxy acrylic acid ethyl, γ-amino acrylic acid propyl, a methacrylic acid stearyl, a methacrylic acid dimethyl amino ethyl, a methacrylic acid diethyl amino ethyl and their derivatives; a vinyl ester-based monomer selected from the group consisting of an acetic acid vinyl, a propionic acid vinyl, a benzoic acid vinyl and their derivatives; a vinyl ether-based monomer selected from the group consisting of a vinyl methyl ether, a vinyl ethyl ether, a vinyl isobutyl ether, a vinyl phenyl ether and their derivatives; a monoolefine-based monomer selected from the group consisting of an ethylene, a propylene, an isobutylene, a 1-butene, a 1-pentene, a 4-methyl-1-pentene and their derivatives; a diolefine-based monomer selected from the group consisting of a butadiene, an isoprene, a chloroprene and their derivatives; and a halogenated olefine-based monomer selected from the group consisting of a vinyl chloride, a vinylidene chloride, a vinyl fluoride and their derivatives.

5. The method of preparing a latex of claim 1, wherein the crystalline monomer has 18 to 32 carbon atoms, and a melting point of 30° C. to 70° C.

6. The method of preparing a latex of claim 1, wherein the crystalline monomer forms a crystalline polymer by copolymerization with the basic monomer, and the amount of the crystalline polymer in the latex is 1 to 50 parts by weight based on 100 parts by weight of the latex.

7. The method of preparing a latex of claim 1, wherein the basic monomer forms a polymer material having a glass transition temperature of 40° C. to 100° C. by polymerization, and the crystalline monomer forms a crystalline polymer material having a melting point of 30° C. to 80° C. by copolymerization with the basic monomer.

8. The method of preparing a latex of claim 1, wherein the dispersing agent is a non-ionic surfactant selected from the group consisting of a polyoxyethylene alkyl ether, a polyoxyethylene alkyl phenyl ether, a polyoxyethylene fatty acid ester, a sorbitan fatty acid ester, a polyoxy sorbitan fatty acid ester, a polyoxyethylene alkyl amine and an oxyethyleneoxypropylene block copolymer.

9. The method of preparing a latex of claim 1, wherein the homogenization is carried out at an agitation speed of 1,000 to 7,000 rpm for 1 to 60 min.

10. The method of preparing a latex of claim 1, wherein the agitation speed is 100 to 800 rpm, and the heating temperature is 50° C. to 80° C.

11. The method of preparing a latex of claim 1, wherein the polymerization initiator is a water-soluble polymerization initiator selected from the group consisting of a persulfate, an azo based compound and a peroxide compound.

12. The method of preparing a latex of claim 1, wherein the polymerization initiator is used in 1 to 5 parts by weight based on 100 parts by weight of the homogenized solution.

13. The method of preparing a latex of claim 1, wherein a reaction time is 5 to 24 hours.

14. The method of of preparing a latex of claim 1, wherein the pigment is a cyan pigment.

15. The method of of preparing a latex of claim 3, wherein the organic phase comprises an octadecyl acrylate as a crystalline monomer and a basic monomer mixture comprising a styrene, a butyl acrylate and an acrylic acid in a mixed weight ratio of 7:2:1 to 7.5:1:0.5.

16. The method of of preparing a latex of claim 15, wherein the aqueous phase comprises the pigment dispersion, an anionic surfactant, and a non-ionic surfactant in water having an ultra-high purity.

17. The method of of preparing a latex of claim 16, wherein the aqueous phase and the organic phase are homogenized at approximately 7,000 rpm for approximately 30 min to form a homogenized solution, and the homogenized solution is poured into a reaction bath, and heated to a temperature of 75° C. while agitating at 100 rpm.

18. The method of preparing a latex of claim 17, wherein, when the temperature within the reaction bath reaches 75° C., potassium persulfate is added as a polymerization initiator, and an inside of the reactor is purged with nitrogen gas, a polymerization reaction is carried out for approximately 24 hours, and after completion of the polymerization reaction, the reaction solution is cooled to room temperature.

* * * * *

UNITED STATES PATENT AND TRADEMARK OFFICE

CERTIFICATE OF CORRECTION

PATENT NO. : 7,307,129 B2
APPLICATION NO. : 11/037068
DATED : December 11, 2007
INVENTOR(S) : Jun-young Lee et al.

It is certified that error appears in the above-identified patent and that said Letters Patent is hereby corrected as shown below:

Column 12, Line 8, after “of” delete “of” (Second Occurrence).

Column 12, Line 10, after “of” delete “of” (Second Occurrence).

Column 12, Line 15, after “of” delete “of” (Second Occurrence).

Column 12, Line 19, after “of” delete “of” (Second Occurrence).

Signed and Sealed this

Tenth Day of June, 2008

JON W. DUDAS
*Director of the United States Patent and Trademark Office*